United States Patent
Sayama

(10) Patent No.: US 8,864,236 B2
(45) Date of Patent: Oct. 21, 2014

(54) HEADREST AND VEHICLE SEAT PROVIDED WITH THE SAME

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 303 days.

(21) Appl. No.: 12/593,971

(22) PCT Filed: Mar. 27, 2008

(86) PCT No.: PCT/JP2008/055889
§ 371 (c)(1),
(2), (4) Date: Sep. 30, 2009

(87) PCT Pub. No.: WO2008/120668
PCT Pub. Date: Oct. 9, 2008

(65) Prior Publication Data
US 2010/0072803 A1   Mar. 25, 2010

(30) Foreign Application Priority Data
Mar. 31, 2007   (JP) ................................ 2007-095909

(51) Int. Cl.
*A47C 7/36*   (2006.01)
*B60N 2/48*   (2006.01)

(52) U.S. Cl.
CPC ............ *B60N 2/4858* (2013.01); *B60N 2/4844* (2013.01); *B60N 2/4847* (2013.01)
USPC ....................................................... 297/408

(58) Field of Classification Search
USPC ........................................ 297/403, 408, 409
See application file for complete search history.

(56) References Cited

U.S. PATENT DOCUMENTS

| | | | |
|---|---|---|---|
| 4,351,563 A * | 9/1982 | Hattori ......................... | 297/408 |
| 5,669,668 A | 9/1997 | Leuchtmann | |
| 6,129,421 A | 10/2000 | Gilson et al. | |
| 6,302,485 B1 * | 10/2001 | Nakane et al. ................ | 297/408 |
| 7,234,778 B1 * | 6/2007 | Toba ............................. | 297/403 |
| 7,306,287 B2 * | 12/2007 | Linardi et al. ................ | 297/410 |
| 7,669,932 B1 * | 3/2010 | Gronninger et al. .......... | 297/408 |
| 8,157,328 B2 * | 4/2012 | Brunner et al. ............... | 297/408 |
| 8,449,036 B2 * | 5/2013 | Jeong ............................ | 297/408 |
| 2001/0026091 A1 * | 10/2001 | Nakane et al. ................ | 297/408 |

(Continued)

FOREIGN PATENT DOCUMENTS

| | | |
|---|---|---|
| EP | 1 190 893 A2 | 3/2002 |
| FR | 2814122 A1 * | 3/2002 |

(Continued)

*Primary Examiner* — David E Allred
(74) *Attorney, Agent, or Firm* — Drinker Biddle & Reath LLP

(57) ABSTRACT

Provided are a versatile and thin headrest, and seat for same, that can be operated smoothly by reducing an operation load at the time when the headrest is tilted from a head support state to a storage state, and is capable of preventing noise caused by the headrest. The headrest includes a pillar having a transverse shaft part and mounted to the upper part of the seat back, a headrest frame rotatably engaged with the transverse shaft part of the pillar, a headrest urging element that urges the headrest frame to one side, a locking element that hinders turning the headrest frame and pillar, a ratchet lever operating the locking element and sliding in the transverse direction, and a ratchet lever urging element, that urges the ratchet lever in the direction at a predetermined angle to the ratchet lever sliding in the transverse direction.

27 Claims, 15 Drawing Sheets

(56) References Cited

U.S. PATENT DOCUMENTS

| | | | |
|---|---|---|---|
| 2001/0028190 A1* | 10/2001 | Nakane et al. | 297/408 |
| 2005/0088027 A1* | 4/2005 | Yetukuri et al. | 297/408 |
| 2006/0186720 A1* | 8/2006 | Linardi et al. | 297/410 |
| 2007/0164593 A1* | 7/2007 | Brockman | 297/408 |
| 2007/0170766 A1* | 7/2007 | Brawner | 297/408 |
| 2007/0284929 A1* | 12/2007 | Keller et al. | 297/408 |
| 2008/0203801 A1* | 8/2008 | Jammalamadaka et al. | 297/408 |
| 2010/0219670 A1* | 9/2010 | Jammalamadaka et al. | 297/408 |
| 2010/0283307 A1* | 11/2010 | Fujita | 297/408 |
| 2010/0327645 A1* | 12/2010 | Jeong | 297/408 |
| 2011/0095592 A1* | 4/2011 | Willard et al. | 297/408 |
| 2012/0062010 A1* | 3/2012 | Holmes et al. | 297/354.1 |
| 2012/0068517 A1* | 3/2012 | Yetukuri et al. | 297/408 |
| 2013/0140866 A1* | 6/2013 | Yetukuri et al. | 297/408 |

FOREIGN PATENT DOCUMENTS

| | | | |
|---|---|---|---|
| JP | 59-014531 A | | 1/1984 |
| JP | 59014531 A | * | 1/1984 |
| JP | 61-88560 U | | 6/1986 |
| JP | 07-11951 U | | 2/1995 |
| JP | 11-348631 A | | 12/1999 |
| JP | 2005-349915 A | | 12/2005 |
| WO | WO 2005-120894 A1 | | 12/2005 |

* cited by examiner

HEADREST AND VEHICLE SEAT PROVIDED WITH THE SAME

CROSS REFERENCE TO RELATED APPLICATIONS

This application is the U.S. national phase of the International Patent Application No. PCT/JP2008/055889 filed Mar. 27, 2008, which claims the benefit of Japanese Application No. 2007-095909, filed Mar. 31, 2007, the entire contents of which are incorporated herein by reference.

BACKGROUND

The present invention relates to a headrest and a vehicle seat provided with the headrest. More particularly, it relates to a headrest capable of being made in a head support state in which the headrest is raised with respect to a seat back and in a storage state tilted from the head support state, and a vehicle seat provided with the headrest.

Generally, a headrest for protecting the passenger's head is mounted on the upper part of a seat back of a vehicle seat. Conventionally, there has been publicly known a configuration in which the lower part of a pillar of the headrest is attached to a transverse rod, which extends in the right and left direction in the seat back, so as to be rotatable in the front and rear direction, and the pillar is attached so as to be movable in the right and left direction, whereby the headrest is moved transversely and then is tilted to the rear to be stored (see Japanese Unexamined Utility Model Application Publication No. 7-11951, hereinafter, "JP '951").

Also, there has been proposed a technique in which a headrest includes a pillar that has a transverse shaft part and is mounted on the upper part of a seat back; a headrest main body the lower side of which is rotatably provided in the transverse shaft part of the pillar; and a tilting mechanism incorporated in the headrest main body to tilt the headrest main body to the rear, and the tilting mechanism includes a headrest urging element or elements that urge the upper part of the headrest main body to the rear side; a lock plate that is provided in the transverse shaft part of the pillar and has a first locking part; a latch that is provided in the headrest main body and has a second locking part that lock to the first locking part of the lock plate; a latch urging element or elements that urge the latch so as to lock the second locking part to the first locking part of the lock plate; and an actuator that disengages the second locking part of the latch from the first locking part of the lock plate against the urging force of the latch urging element or elements (see Japanese Unexamined Patent Application Publication No. 2005-349915, hereinafter "JP '915").

Furthermore, there has been proposed a technique in which in a tilting headrest in which a bracket can be moved to a folded position and to an erected position, a concave part is formed in a locking reciprocating member and a locking member, and the locking reciprocating member is made slidable to a locked position and to an unlocked position by a spring (see U.S. International Patent Publication WO2005/120894A1, hereinafter "WO '894").

The publicly known example of JP '951 has a problem in that the headrest rotates to the rear greatly together with the pillar and therefore the displacement thereof is large, and also the headrest occupies a large space when being stored because the rotating support point of the headrest exists in the upper part of the seat back under the headrest.

That is to say, when the headrest is tilted to the rear, the whole of the headrest projects to the rear side. This example also has a problem in that a pillar movement groove must be formed in the upper part of the seat back, so that not only is the construction complicated but also the headrest cannot be used commonly for other seat backs.

The publicly known technique of JP '915 has high versatility because the tilting mechanism of the headrest can be accommodated entirely in the headrest main body. However, this technique has a problem in that a size of some degree must be secured in the front and rear direction, and the thinning of headrest is limited because the first locking part of the lock plate and the second locking part provided on the latch to be locked to the first locking part are used, and the lock plate and the latch are arranged in the tilt direction.

In the publicly known technique of WO '894, the concave part is formed in the locking reciprocating member and the locking member, and the locking reciprocating member is made slidable to a locked position and to an unlocked position by the spring. Since the locked position and the unlocked position are changed over by the two members of the locking reciprocating member and the locking member, a spring force for urging a bracket in the fold direction is applied directly to the locking reciprocating member and the locking member, so that in some cases, it is difficult for the reciprocating movement of the locking reciprocating member to be accomplished smoothly. Also, in the case where a plurality of locking members are present, one locking reciprocating member is made slidable to the locked position and the unlocked position with respect to all the locking members. Therefore, this technique has a disadvantage in that the locking reciprocating member becomes large, so that a higher load is applied to the locking reciprocating member.

Also, in any of the above-described publicly known techniques, in a condition where vibrations occur, for example, when the vehicle is running, consideration has not been given to abnormal sounds and noise caused by the headrest.

SUMMARY

An object of the present invention is to provide a headrest that has high versatility, is thin in shape, and is capable of being operated smoothly by reducing an operation load at the time when the headrest is tilted from a head support state to a storage state, and a vehicle seat provided with the headrest.

Another object of the present invention is to provide a headrest capable of preventing abnormal sounds and noise caused by a headrest in a condition where vibrations occur, for example, when the vehicle is running, and a vehicle seat provided with the headrest.

To achieve the above objects, various embodiments of the present invention provide a headrest capable of being made in a head support state in which the headrest is raised with respect to a seat back and in a storage state tilted from the head support state, including a supporting member mounted on the upper part of the seat back; a headrest frame rotatably engaged with the supporting member; a frame urging element or elements that urge the headrest frame to one side; a locking element or elements that hinder the rotating of the headrest frame and the supporting member; and an operation lever for operating the locking element or elements, wherein the operation lever having a concave part formed toward the supporting member side is formed so as to be movable in the direction different from the rotating direction of the headrest frame, and is urged in the predetermined direction by an operation lever urging element or elements.

At this time, it is preferable that the operation lever urging element or elements urge the operation lever in the direction at a predetermined angle to the movement direction of the operation lever.

To solve the above object, various embodiments of the present invention provide a headrest capable of being made in a head support state in which the headrest is raised with respect to a seat back and in a storage state tilted from the head support state, including a pillar having a transverse shaft part and mounted to the upper part of the seat back; a headrest frame rotatably engaged with the transverse shaft part of the pillar; a headrest urging element or elements that urge the headrest frame to one side; a locking element or elements that hinder the rotating of the headrest frame and the pillar; a ratchet lever that operates the locking element or elements and slides in the transverse direction; and a ratchet lever urging element or elements that urge the ratchet lever, wherein the ratchet lever urging element or elements urges the ratchet lever in the direction at a predetermined angle to the ratchet lever sliding in the transverse direction.

By the above-described configuration, a force in the fixed direction is applied to the operation lever (ratchet lever), and the movement in the direction different from the movement direction of the operation lever (ratchet lever) is regulated by this force in the fixed direction, so that looseness can be prevented, and the occurrence of abnormal sounds (noise) can be prevented.

In the above-described configuration, it is preferable that a cover material be disposed on the outer periphery side of the headrest frame; at the arrangement position of the ratchet lever of the cover material, a hole be formed so that the end part of the ratchet lever is extendable; a garnish be disposed in the hole; in the end part of the ratchet lever extending from the garnish, an operation knob be disposed; and the operation knob coming closest to the garnish in the urging direction of the ratchet lever urging element or elements.

If the operation knob is configured so as to come closest to the garnish in the urging direction of the urging element or elements as described above, the distance between the operation knob and the garnish becomes shortest, or the operation knob comes into contact with the garnish, so that looseness caused by swaying and the like during running can be prevented.

Also, in the above-described configuration, it is preferable that the headrest frame be formed with at least a tongue piece, which is bent to the inside toward the ratchet lever, on the opposite side to the arrangement position of the ratchet lever urging element or elements so as to hold the ratchet lever, and the tongue piece serve as a guide for the ratchet lever.

By the above-described configuration, on the side of disposition position of the ratchet lever urging element or elements, the distance between the operation knob and the garnish is made shortest, or the operation knob is brought into contact with the garnish, and on the other side, the position is fixed by a portion in which the ratchet lever comes into contact with the tongue piece and is guided. Therefore, looseness of the ratchet lever caused by swaying and the like during running can be prevented, and the occurrence of abnormal sounds and noise can be prevented.

To achieve the above object, various embodiments of the present invention provide a vehicle seat provided with the headrest having the above-described configuration.

According to various embodiments of the present invention, there can be provided a headrest that has high versatility, is thin in shape, and is capable of being operated smoothly by reducing an operation load at the time when the headrest is tilted from a head support state to a storage state, and a vehicle seat provided with the headrest.

Also, in a condition where vibrations occur, for example, when the vehicle is running, abnormal sounds and noise caused by the headrest can be prevented.

BRIEF DESCRIPTION OF THE DRAWINGS

The invention is described below with reference to the various embodiments illustrated in the drawings.

DETAILED DESCRIPTION OF THE EMBODIMENTS

An embodiment of the present invention will now be described with reference to the accompanying drawings. The members, arrangements, and the like explained below do not restrict the present invention, and can be changed variously without departing from the spirit and scope of the present invention.

Figure 1:
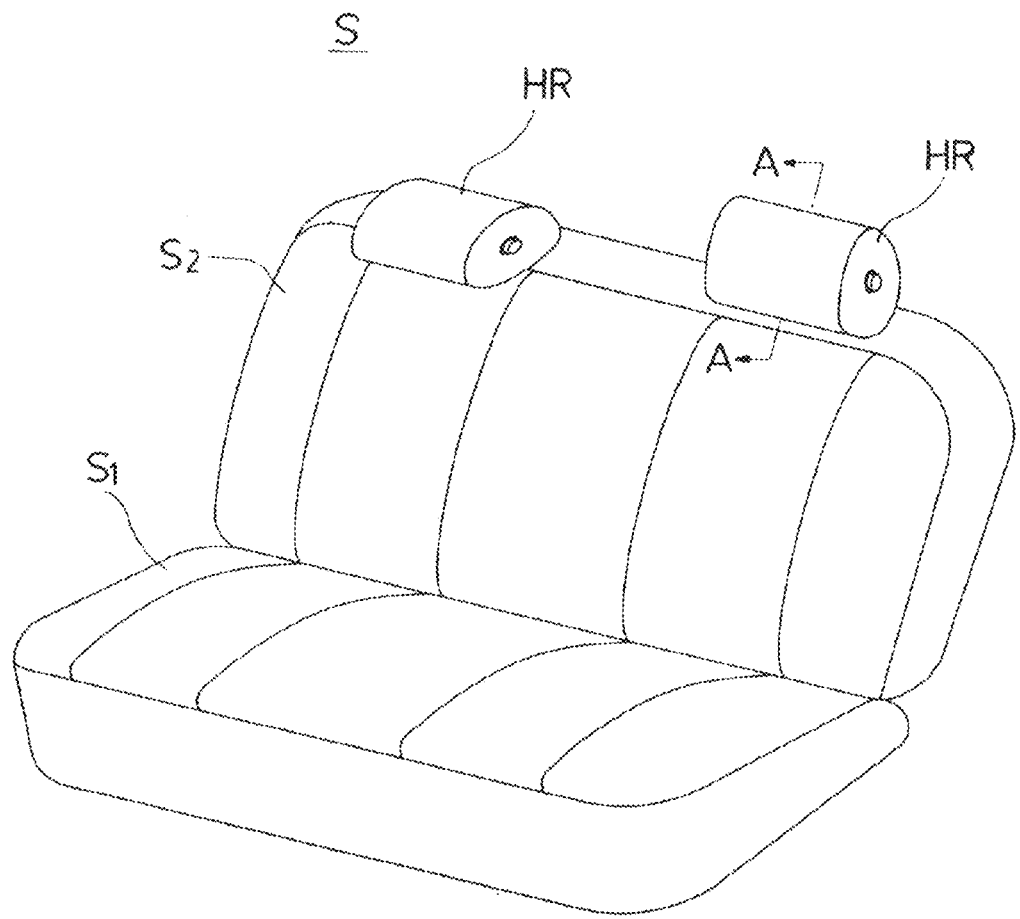
FIG. 1 is a perspective view of a seat provided with a seat back and a headrest.

A vehicle seat S of this embodiment is an example of a rear seat of an automobile seat. As shown in FIG. 1, the vehicle seat S includes a seat cushion S1 and a seat back S2, and in the upper part of the seat back S2, a headrest HR is provided. The seat cushion S1 and the seat back S2 have a publicly known configuration in which a frame, a pad, and a seat cover material for covering the frame and pad are provided, and therefore the details thereof are omitted. In this embodiment, explanation is given by taking the rear seat of the automobile seat as an example. However, the present invention can be applied to a front seat or an intermediate seat of vehicle as far as the seat can be mounted with the headrest.

The headrest HR of this embodiment can be mounted on the seat back S2 via a pillar 1 serving as a supporting member so that the height thereof can be adjusted. To adjust the height of the headrest HR, a publicly known height adjusting mechanism can be used, and therefore the details of the mechanism are omitted.

As shown in FIG. 1, the headrest HR of this embodiment can be made in a head support state in which the headrest HR is raised with respect to the seat back S2 and in a storage state tilted from the head support state (in the example shown in FIG. 1, the left-hand side in the figure shows the storage state).

Figure 6:
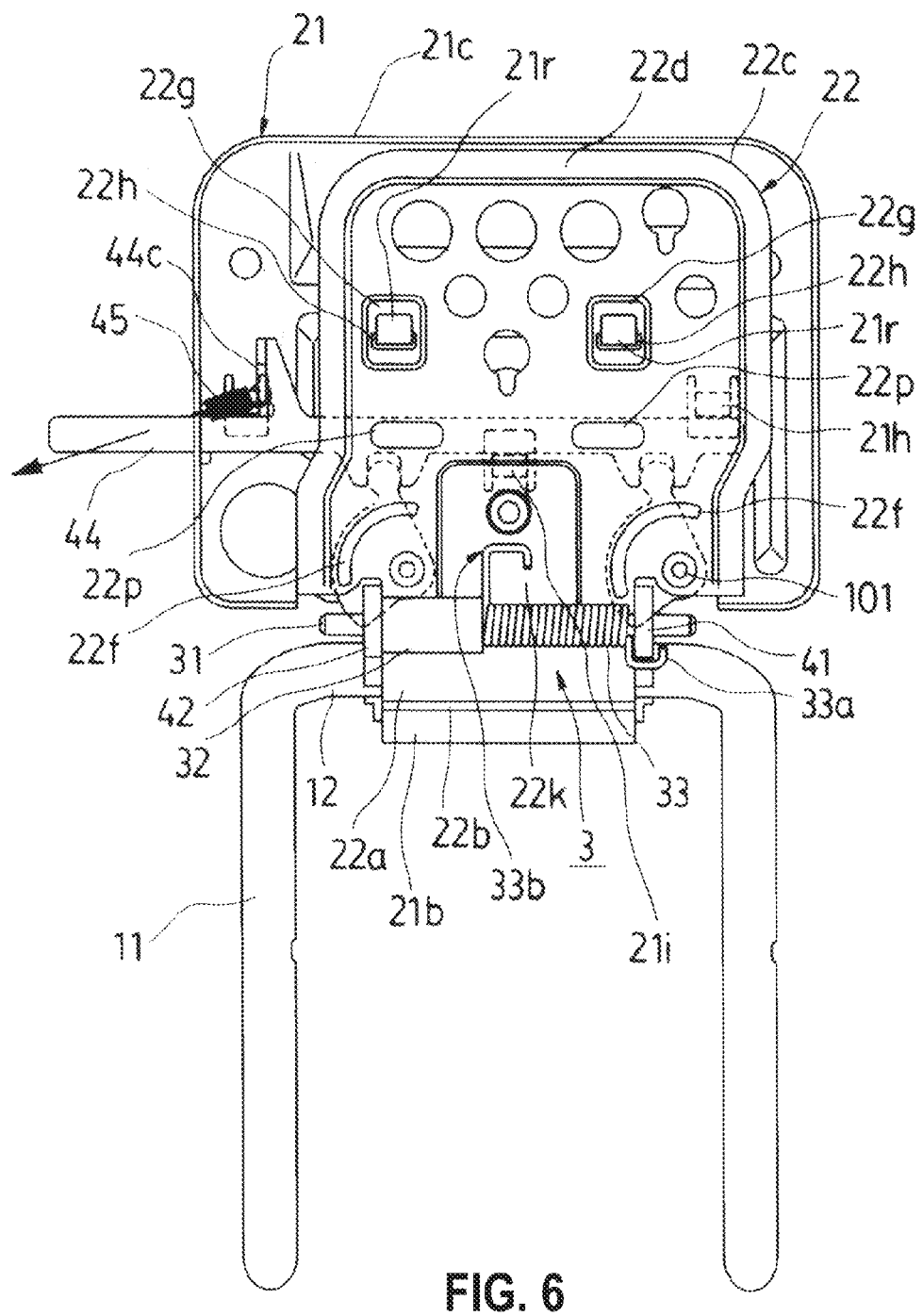
FIG. 6 is a rear view of FIG. 4.
Figure 7:
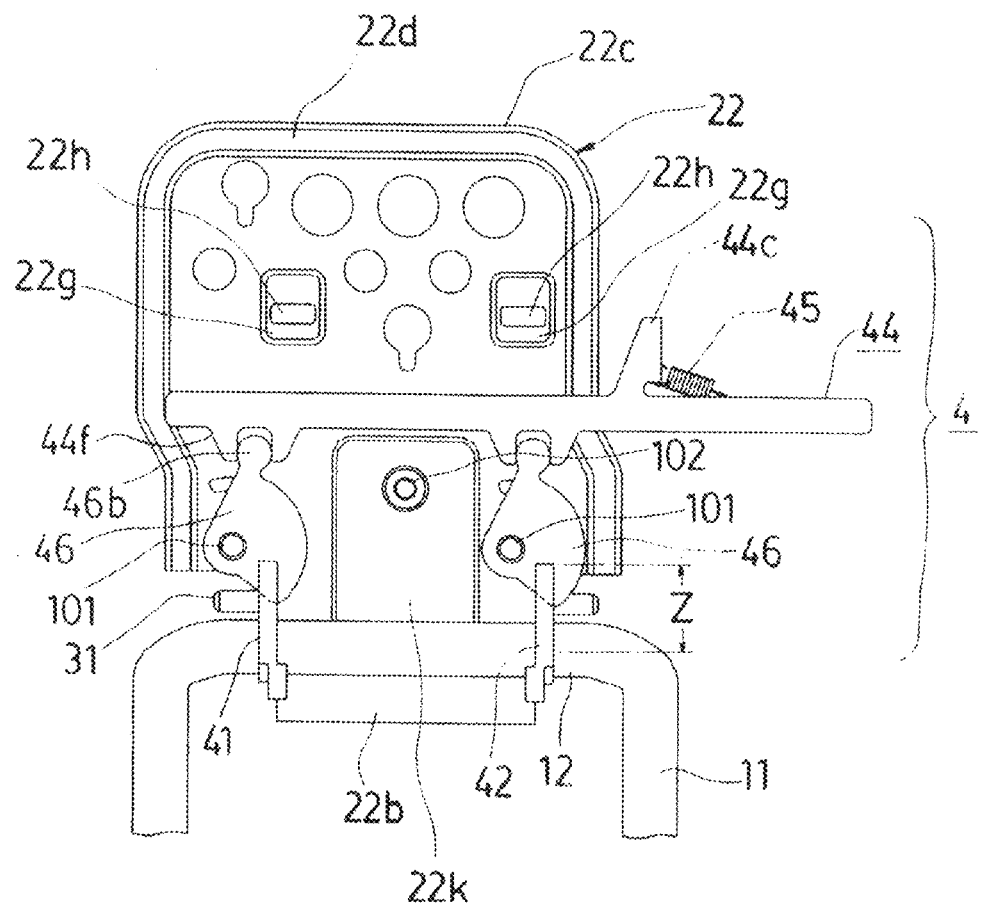
FIG. 7 is a pictorial illustrative view of locking elements.
Figure 8:
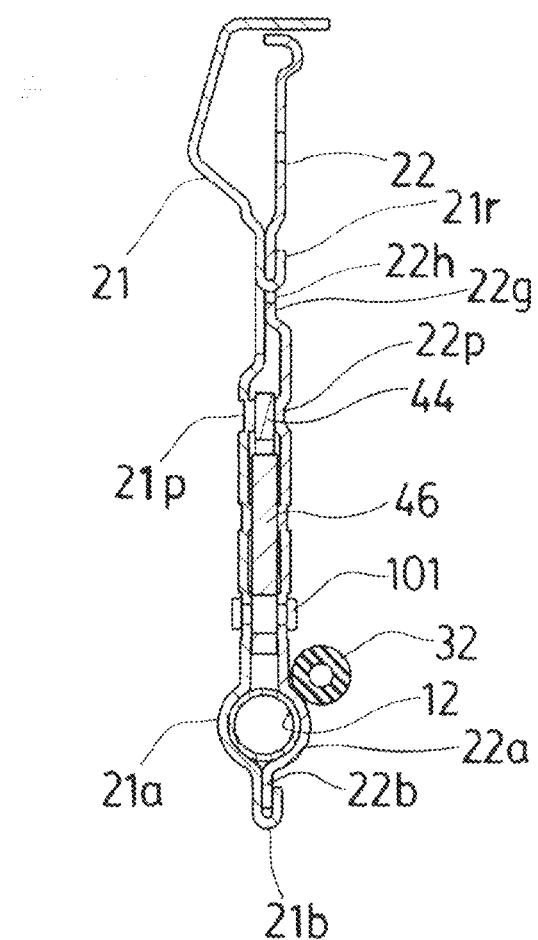
FIG. 8 is a sectional view taken along the line B-B of FIG. 5.

The headrest HR of this embodiment includes, as principal components, the pillar 1 (FIG. 3) serving as the supporting member, a headrest frame 2 (FIG. 4) serving as a frame, headrest frame urging elements 3 (FIG. 6) serving as frame urging elements, and locking elements 4 (FIG. 7).

Figure 3:
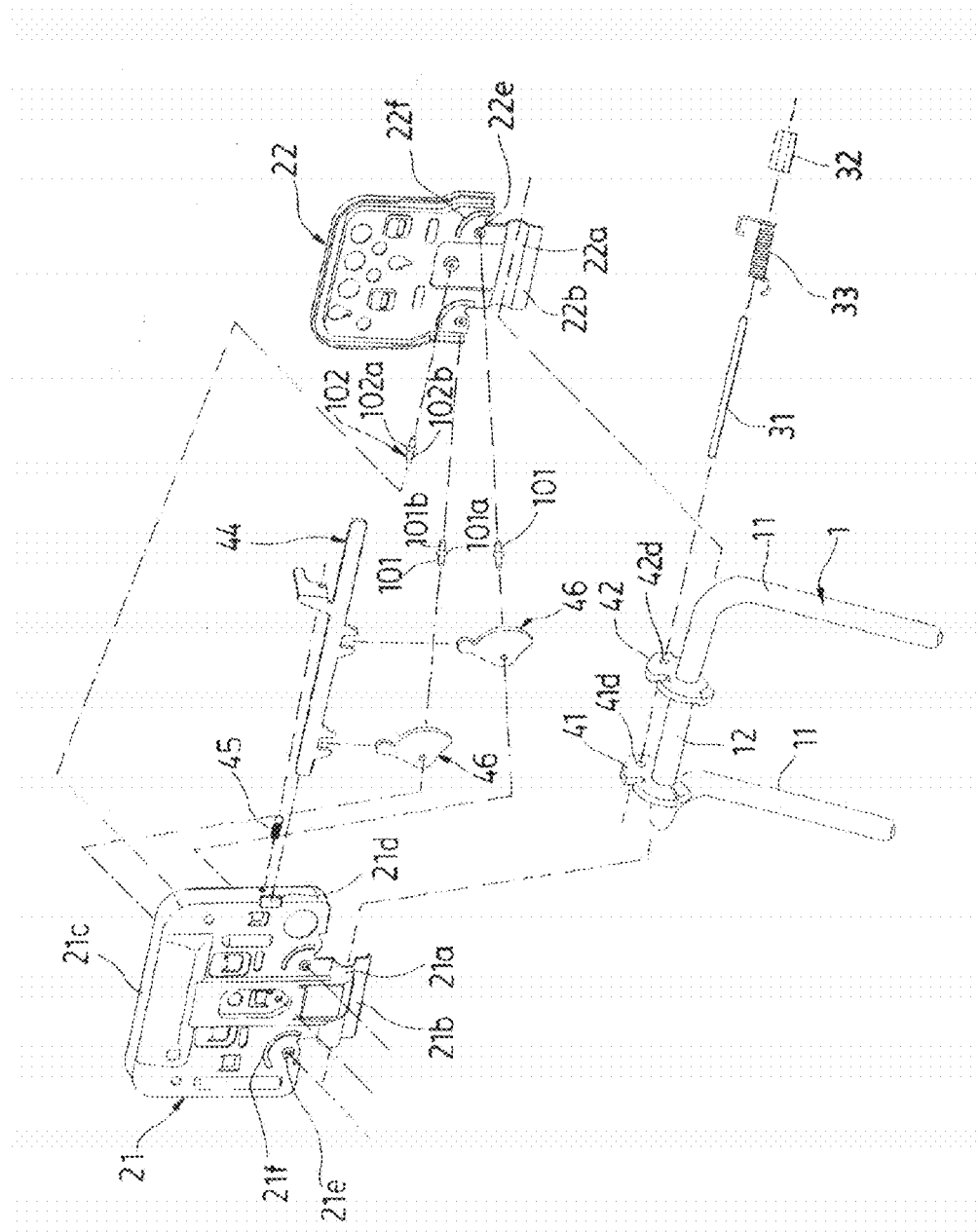
FIG. 3 is an exploded perspective view of a headrest frame and a locking elements.
Figure 9:
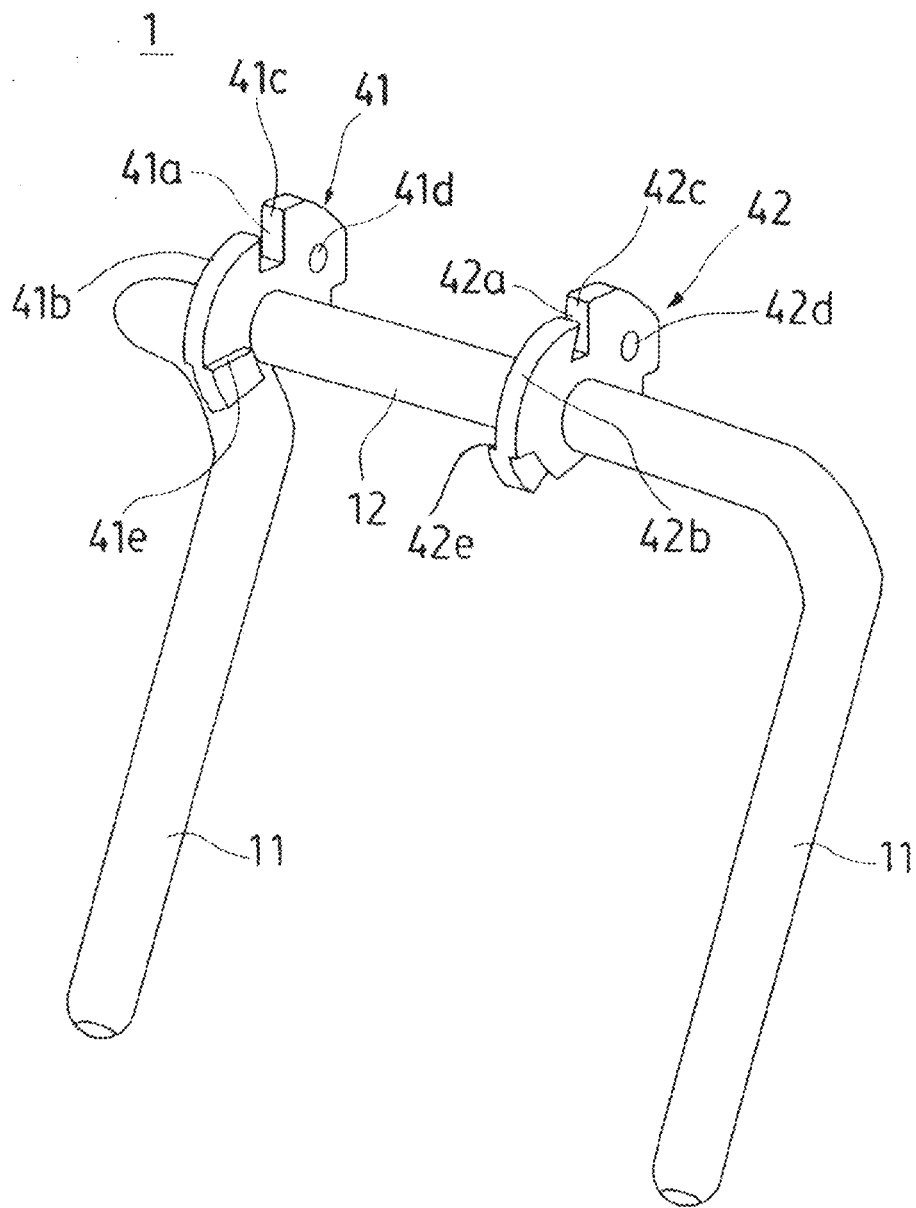
FIG. 9 is a perspective view of a pillar.

As shown in FIGS. 3 and 9, the pillar 1 serving as the supporting member of this embodiment has two leg parts 11, 11 mounted on the upper part of the seat back S2, and a transverse shaft part 12 for connecting the two leg parts 11, 11 to each other. To the transverse shaft part 12 of the pillar 1, latch plates 41 and 42 serving as locking members are fixed perpendicularly to the axis of the transverse shaft part 12 at a predetermined interval by welding or the like. A portion between the latch plates 41 and 42 of the transverse shaft part 12 is rotatably held by substantially semicircular lower assembling concave parts 21a and 22a formed in the lower part of the headrest frame 2 (a main frame 21 and a sub frame 22) serving as the frame, described below.

The latch plates 41 and 42 of this embodiment constitute the locking elements 4, described below.

The headrest frame 2 serving as the frame of this embodiment is rotatably engaged with the transverse shaft part 12 of the pillar 1 as described above, and as shown in FIGS. 3 and 6, is configured by being combined by a plurality of hemming staking parts 21r, 21r and blanked drawn parts 22g each having a hole 22h and hemming staking parts 21b and 22b, described below, so that the sub frame 22 enters the main frame 21.

In the headrest frame 2 comprising the main frame 21 and the sub frame 22, a ratchet lever 44 serving as an operation lever and ratchets 46 serving as fixing members are held. The main frame 21 and the sub frame 22 are assembled integrally to each other by staking from both front and rear sides with rivets 101 and 102 being held between them. The central parts 101a and 102a of the rivets 101 and 102 have a large diameter, and on both sides of the central parts 101a and 102a, staking parts 101b and 102b are formed. The ratchet lever 44 and the ratchets 46 of this embodiment constitute the locking elements 4, described below.

Figure 5:
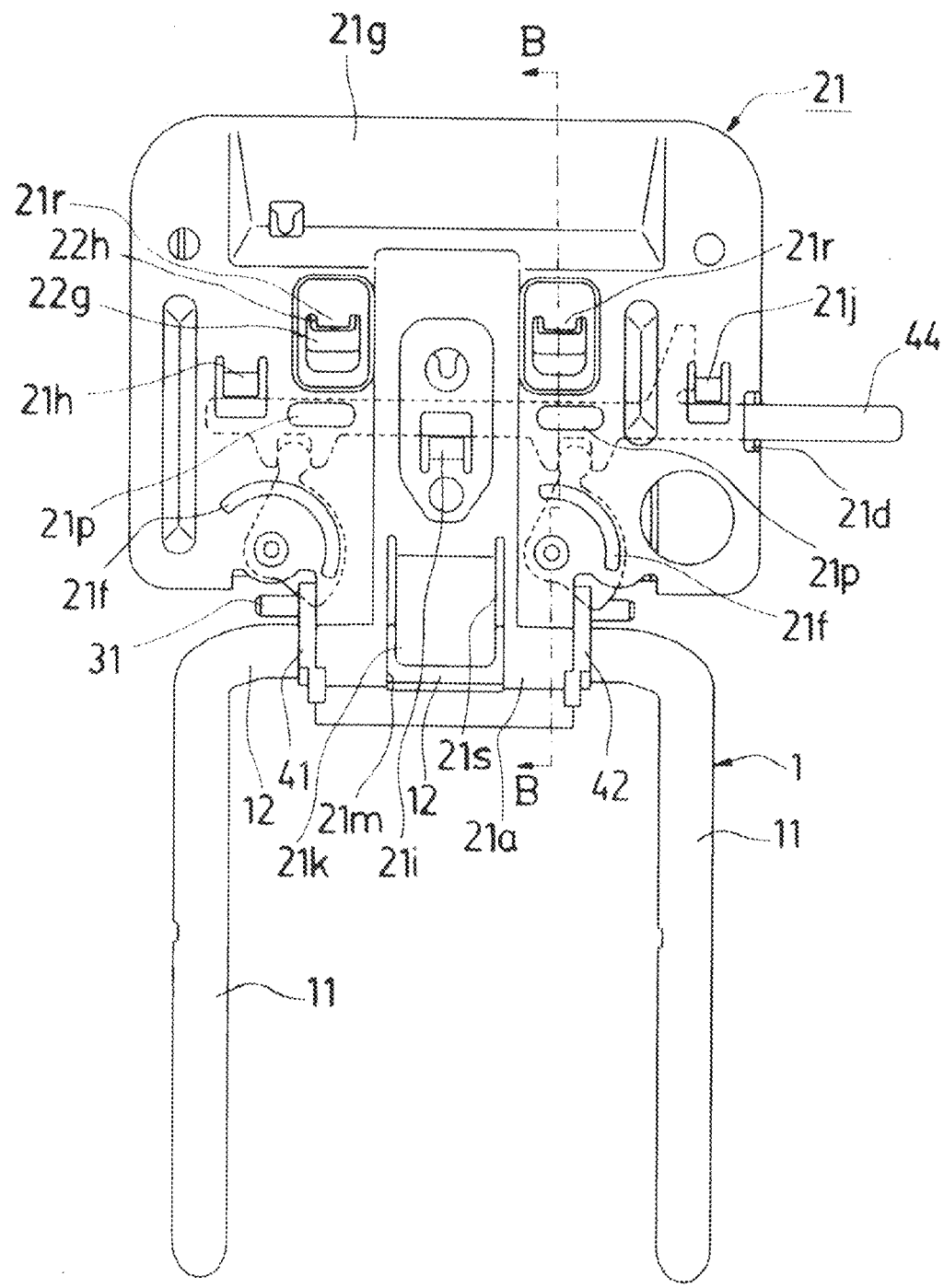
FIG. 5 is a front view of FIG. 4.

As shown in FIGS. 3 and 5, the main frame 21 of this embodiment comprises a rectangular plate body. In the lower part thereof, the substantially semicircular lower assembling concave part 21a is formed, and the hemming staking part 21b is formed so as to be continuous with the lower assembling concave part 21a. The lower assembling concave part 21a is formed with a cut-away part 21m formed by cutting the middle part, and a looseness preventing piece 21k is formed so as to be directed to the cut-away part 21m. On both sides of the looseness preventing piece 21k, slits 21s are formed. This looseness preventing piece 21k has a spring effect due to the slits 21s, and is in contact with the transverse shaft part 12 of the pillar 1 so as to be pressed against the transverse shaft part 12. By this, the looseness between headrest frame 2 and the pillar 1 can be prevented with more certainty.

On the upper side of the main frame 21, a jutting-out 21g is formed. This jutting-out 21g is in contact with a projecting portion of a resin-made front cover member 7a, described below, and also secures the strength.

Also, at the outer periphery of the main frame 21, a bent wall part 21c is formed excluding predetermined ranges on both sides of the lower assembling concave part 21a.

On the inside of the main frame 21, boss parts 21e are formed in portions, through which the rivets 101 serving as the rotation shafts for the ratchets 46 are inserted, so as to project toward the inside. Also, on the outer periphery side of the boss part 21e, a substantially arc-shaped protruding part 21f is formed so as to project toward the rotating surface of the ratchet 46. This substantially arc-shaped protruding part 21f, together with a substantially arc-shaped protruding part 22f formed on the sub frame, described below, guides the ratchet 46 so that the ratchet 46 can be turned without play by being held between the protruding parts 21f and 22f.

On one side face of the bent wall part 21c, a cut-away part 21d is formed. The ratchet lever 44 is inserted through this cut-away part 21d. Also, on the extension of the cut-away part 21d, three tongue pieces 21h, 21i and 21j that are bent toward the inside are formed so as to serve as guides at the time when the ratchet lever 44 is inserted through.

The two tongue pieces 21h and 21j of the three tongue pieces 21h, 21i and 21j are bent toward the inside from the upside to the downside, and are formed at an interval in the right and left direction. In a substantially central portion of the tongue pieces 21h and 21j arranged in the right and left direction, one tongue piece 21i that is bent toward the inside from the downside to the upside is formed. The ratchet lever 44 is inserted through by using the three tongue pieces 21h, 21i and 21j as the guides. The ratchet lever 44 of this embodiment constitutes the locking elements 4, described below.

Furthermore, in the state in which the ratchet lever 44 is inserted through, at the position of the ratchet lever 44 of the main frame 21, embossed parts 21p, 21p directed to the ratchet lever 44 side are formed. The embossed parts 21p, together with embossed parts 22p formed on the sub frame 22, described below, guide the ratchet lever 44 so that the ratchet lever 44 can be moved without play by being held between the embossed parts 21p and 22p.

As shown in FIGS. 3, 6 and 7, the sub frame 22 of this embodiment comprises a rectangular plate body, and is configured so that the upper part of a predetermined position, that is, the arrangement position of the above-described ratchet lever 44 in this embodiment, is offset to one side (toward the direction distant from the cut-away part 21d).

Also, as shown in FIGS. 6 and 7, a bent part 22c is formed in the upper part and at the right and left excluding the lower side. The inside of the bent part 22c is formed as an expanding part 22d expanding from the normal surface. This expanding part 22d, together with an urge receiving part 22k, described below, makes the normal surface (in a plane perpendicular with a viewing direction of the view illustrated in FIG. 6) low. By this, the configuration is made such that the rivets 101 and 102 and the hemming staking parts 21r, 21r are at positions lower than the expanding part 22d and the urge receiving part 22k, so that interference with other members can be prevented.

As shown in FIG. 7, at positions separating through a predetermined distance from the centerline of the sub frame 22, the blanked drawn parts 22g that project to the opposed main frame 21 side and have the hole 22h for hemming staking are formed.

In the lower part of the sub frame 22, the substantially semicircular lower assembling concave part 22a is formed, and the hemming staking part 22b is formed so as to be continuous with the lower assembling concave part 22a.

As described above, the main frame 21 and the sub frame 22 are staked in the same direction from the main frame 21 side to the sub frame 22 side by the hemming staking parts 21r, 21r and the blanked drawn parts 22g each having the hole 22h and the hemming staking parts 21b and 22b. Therefore, the working is easy as compared with the case of burring. The main frame 21 side is configured so that the staking claw and the like are not exposed, and the headrest frame side on the side of coming into contact with the passenger's head is configured so that protrusions and the like are absent as far as possible.

Also, on the opposite side to the hemming staking part 22b, the urge receiving part 22k is formed by drawing so as to be continuous with the lower assembling concave part 22a. As shown in FIG. 6, this urge receiving part 22k is configured so as to be in contact with the other end 33b of a spring 33, and is formed so as to be raised on the spring arrangement side. Also, the urge receiving part 22k is in contact with the spring 33 constituting the headrest frame urging elements 3 and also comes into contact with a damper 32, described below, at the rotating time, thereby preventing looseness and noise.

The bent part 22c (refer to FIG. 7) that is bent to the inside is formed in the upper part and at the right and left excluding the side on which the substantially semicircular lower assembling concave part 22a is provided.

On the sub frame 22, boss parts 22e projecting toward the inside are formed at positions matching the boss parts 21e of the main frame 21, that is, in portions through which the rivets 101 serving as the rotation shafts for the ratchets 46 are inserted. At positions of the ratchet lever 44 of the sub frame 22, the embossed parts 22p, 22p directed to the ratchet lever 44 side are formed.

Also, on the inside of the sub frame 22, the substantially arc-shaped protruding parts 22f projecting toward the rotating surface of the ratchet 46 are formed so as to match the substantially arc-shaped protruding parts 21f formed on the main frame 21.

As shown in FIGS. 3 and 6, the headrest frame urging elements 3 serving as the frame urging elements are configured so as to urge the headrest frame 2 to one side (that is, the tilt side), and includes a shaft 31, the damper 32, the spring 33, shaft insertion holes 41d and 42d formed in the latch plates 41 and 42 constituting the locking elements 4, and the above-described urge receiving part 22k.

The shaft 31 is a round bar, and the damper 32 is formed by a hollow cylindrical body made of rubber. Also, the spring 33 is disposed so that one end 33a thereof is locked to the latch plate 41, and the other end 33b side is in contact with the damper 32. Also, the other end 33b is made a wide pressing part, and is brought into contact with the above-described urge receiving part 22k. By urging, at the normal time, the headrest frame 2 is subject to an urging force toward the tilt direction.

In assembling, the shaft 31 is inserted between the two latch plates 41 and 42. The shaft 31 is inserted through the shaft insertion hole 41d (or 42d) in one latch plate 41 (or 42), and then the damper 32 and the spring 33 are placed on the shaft 31. Next, the shaft 31 is inserted through the shaft insertion hole 42d (or 41d) in the other latch plate 42 (or 41).

Symbol 4 shown in FIG. 7 denotes the locking elements, which are provided between the pillar 1 and the headrest frame 2.

The locking elements 4 of this embodiment include, as principal components, the latch plates 41 and 42 serving as the locking members, the ratchet lever 44 serving as the operation lever, the ratchets 46 serving as the fixing members, and a spring 45 serving as a ratchet lever urging elements (operation lever urging elements).

As described above, the latch plates 41 and 42 of this embodiment are fixed to the transverse shaft part 12 of the pillar 1 perpendicularly to the axis of the transverse shaft part 12 at a predetermined interval by welding or the like.

As shown in FIG. 9, in the upper parts of the latch plates 41 and 42, engagement groove parts 41a and 42a are formed along the transverse shaft part 12.

On the latch plates 41 and 42, arcuate outer peripheral parts 41b and 42b and stopper parts 41c and 42c configured by walls of portions of the engagement groove parts 41a and 42a are formed.

In this embodiment, the latch plates 41 and 42 are formed so that the engagement groove parts 41a and 42a have a different shape. The engagement groove part 42a of the latch plate 42 provided on the right-hand side in FIG. 9 is formed so that the upper end side thereof is narrower, and the engagement groove part 41a of the latch plate 41 provided on the left-hand side in FIG. 9 is formed into a shape such that the groove width is unchanged in the up and down direction. On the end part side (the lower side in FIG. 9) on the side on which the headrest frame 2 of the latch plates 41 and 42 tilts, stopper parts 41e and 42e are formed.

Figure 11:
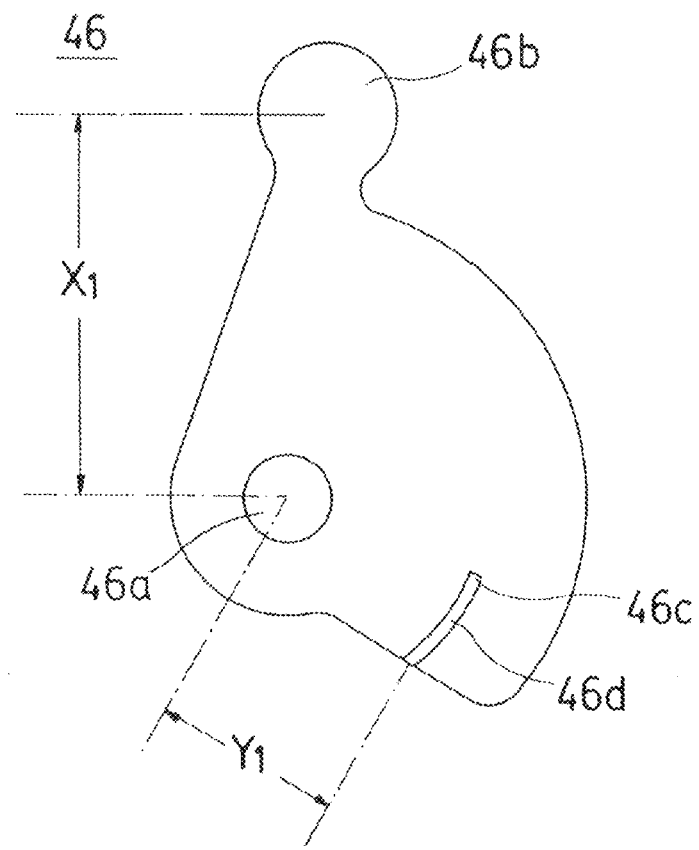
FIG. 11 is a plan view of a ratchet.
Figure 12:
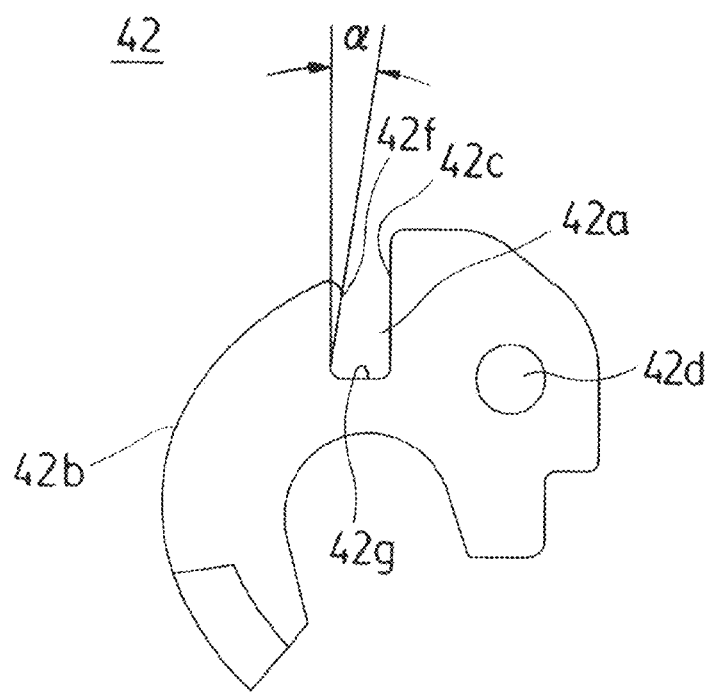
FIG. 12 is a side view of a latch plate.

FIG. 12 is a side view of the latch plate 42. The upper side of the engagement groove part 42a of the latch plate 42 tilts to the inside with a portion that is slightly wider than the thickness of the ratchet 46 being left (angle α in FIG. 12). Thus, in this embodiment, the engagement groove part 42a of at least one latch plate (in this embodiment, the latch plate 42) is formed so that the upper end side is narrower. Therefore, the contact points between the latch plate 42 and the ratchet 46 in an raised state are an upper end part 42f of the engagement groove part 42a of the latch plate 42 and a lock engagement point 46c of the ratchet 46 shown in FIG. 11. The lock engagement point 46c, which is the contact point, is at a side position at the time when the ratchet 46 comes into contact with a groove bottom 42g of the engagement groove part 42a of the latch plate 42.

Symbol 46d shown in FIG. 11 denotes a locus along which the ratchet 46 is moved from a disengagement position deviating from the engagement groove part 42a to a position at which the ratchet 46 comes into contact with the groove bottom 42g of the engagement groove part 42a of the latch plate 42.

That is to say, as shown in FIG. 7, the configuration is made such that the narrower portion of the latch plate 42 (see FIG. 9) that comes into contact with the ratchet 46 on this portion's upper end side has a larger distance Z from the transverse shaft part 12 of the pillar 1 than other parts of the ratchet 46 located in the engagement groove part 42a. Therefore, the contact point separates from the axis (the rotation center of the headrest frame 2) of the transverse shaft part 12 of the pillar 1, and when the ratchet 46 moves from the engagement position to the disengagement position (when the locking is released), the release load due to the urging force of the headrest frame urging element 3 (the spring 33) from the rear can be reduced, which enables the adjustment of release load. In the case of this embodiment, the engagement groove part 42a of the latch plate 42 located on the side engaging with an operation knob of the ratchet lever 44 is formed so as to have a narrow width, so that the transmission of a force from the ratchet lever 44 can be accomplished with certainty.

Also, the latch plates 41 and 42 are provided with the shaft insertion holes 41d and 42d for inserting the shaft 31, respectively.

Figure 10:
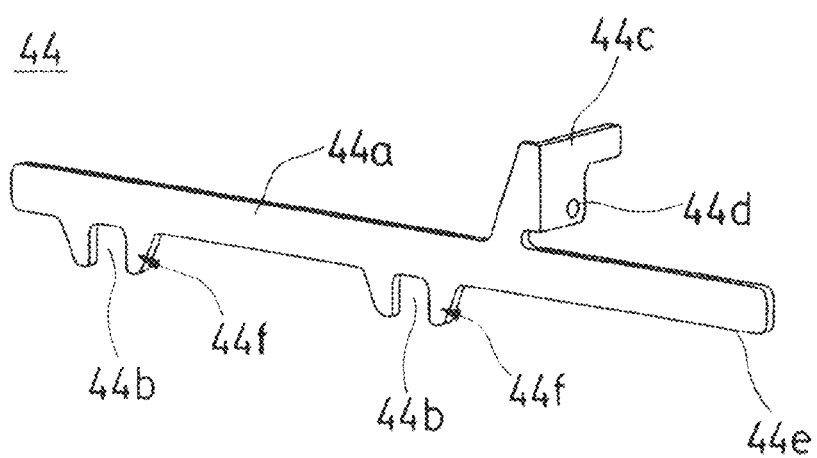
FIG. 10 is a perspective view of a ratchet lever.

As shown in FIG. 10, the ratchet lever 44 of this embodiment is formed by a slender plate body. A main plate body 44a slides in the transverse direction, and the main plate body 44a is formed with engagement concave parts 44b, 44b directed to the pillar 1 side. On the opposite side to the engagement concave parts 44b, 44b, a movement locking part 44c is formed substantially at right angles to the main plate body 44a, and the movement locking part 44c is formed with a locking part 44d of the ratchet lever urging element 45.

Each of the engagement concave parts 44b, 44b is formed between jutting-out parts 44f, 44f projecting from the main plate body 44a to the pillar 1 side, and is formed so as to hold one circular end side of the ratchet 46 and to allow the ratchet 46 to rotate.

To the ratchet lever 44, one end of the ratchet lever urging element (the spring 45) is connected so that the ratchets 46 are urged in the direction of the engagement groove parts 41a and 42a of the latch plates 41 and 42. Symbol 44e denotes the end part side engaged with the operation knob.

Figure 4:
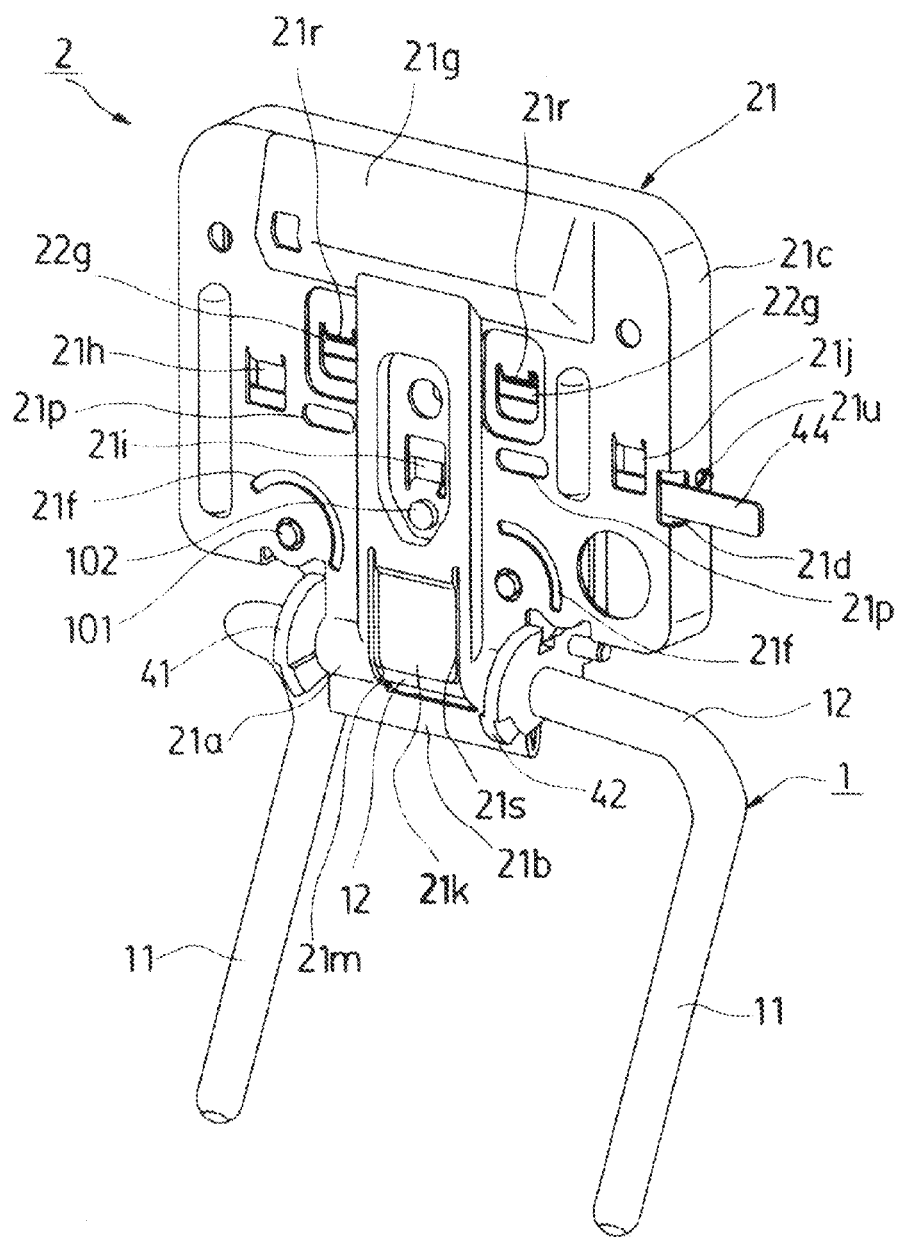
FIG. 4 is a perspective view of a headrest frame to which a pillar is assembled and a locking elements, viewed from the side on which the headrest frame comes into contact with the passenger's head.

At this time, in the movement locking part 44c of the ratchet lever 44, a locking part 44d on one end side of the spring 45 is formed, and in the bent wall part 21c of the main frame 21 located on the lower side (FIG. 6) of the locking part 44d of the spring 45, a locking part 21u on the other side of the spring 45 is formed (refer to FIG. 4). As indicated by an arrow mark in FIG. 6, due to the difference in locking position, the spring 45 urges the movement locking part 44c of the ratchet lever 44 slantwise downward.

The main frame 21 is formed with the tongue pieces 21h and 21i. When the ratchet lever 44 is urged as indicated by the arrow mark in FIG. 6, the other end side of the ratchet lever 44 is urged to the tongue piece 21h side with the tongue piece 21i being a support point. Therefore, the operation knob 47 side of the ratchet lever 44 comes closest to or into contact with the garnish 7d, and the other side thereof comes into contact with the tongue piece 21h, whereby the movement in the up and down direction is regulated. By doing this, in a condition where vibrations occur, for example, when the vehicle is running, abnormal sounds and noise caused by the movement of the ratchet lever 44 can be prevented.

Figure 15:
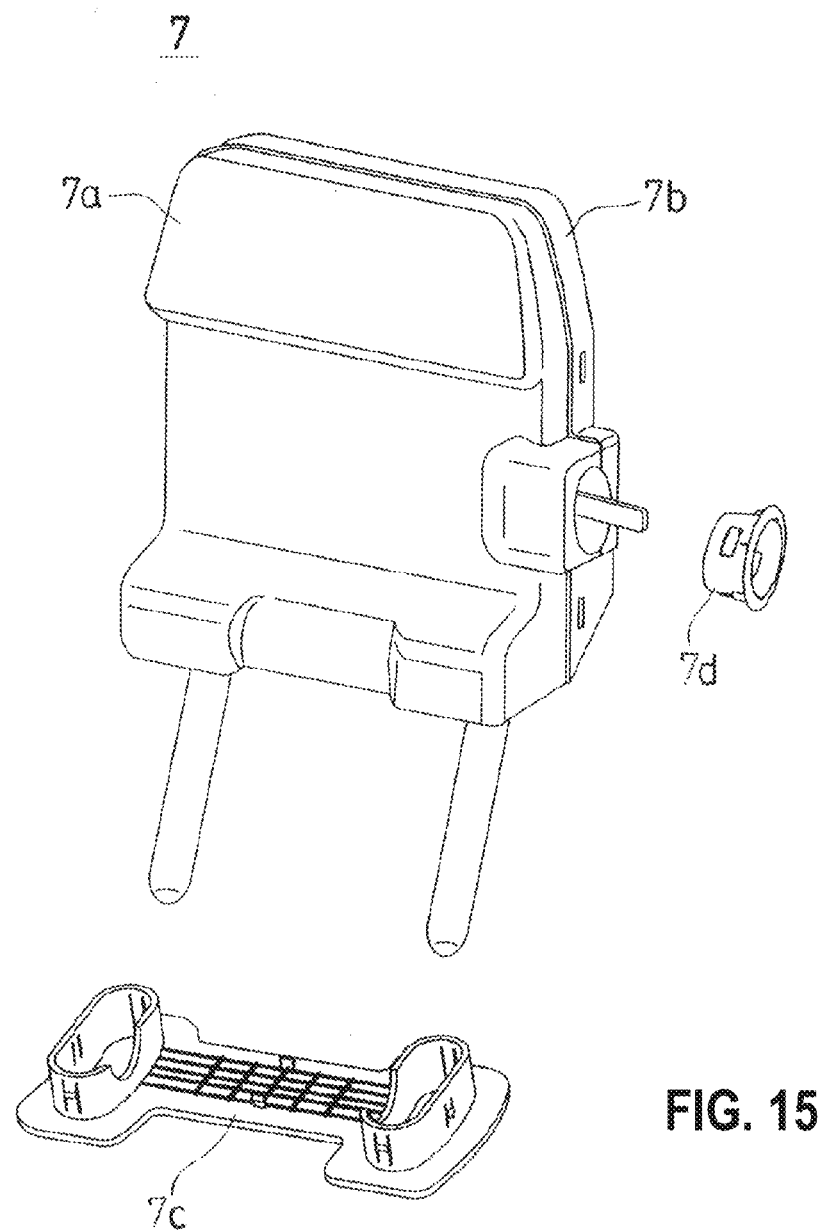
FIG. 15 is a partially exploded perspective view of a cover.

FIG. 15 shows an assembled state of a cover material 7. After the pillar 1 serving as the supporting member, the headrest frame 2 serving as the frame, the headrest frame urging elements 3 serving as the frame urging elements, the locking elements 4, and the like have been assembled, these elements are covered with the cover material 7. The cover material 7 includes the resin-made front cover member 7a and rear cover member 7b, a seat cover fastening cover member 7c, and a garnish 7d for preventing the operation knob and the like of the control section from coming off.

Figure 2:
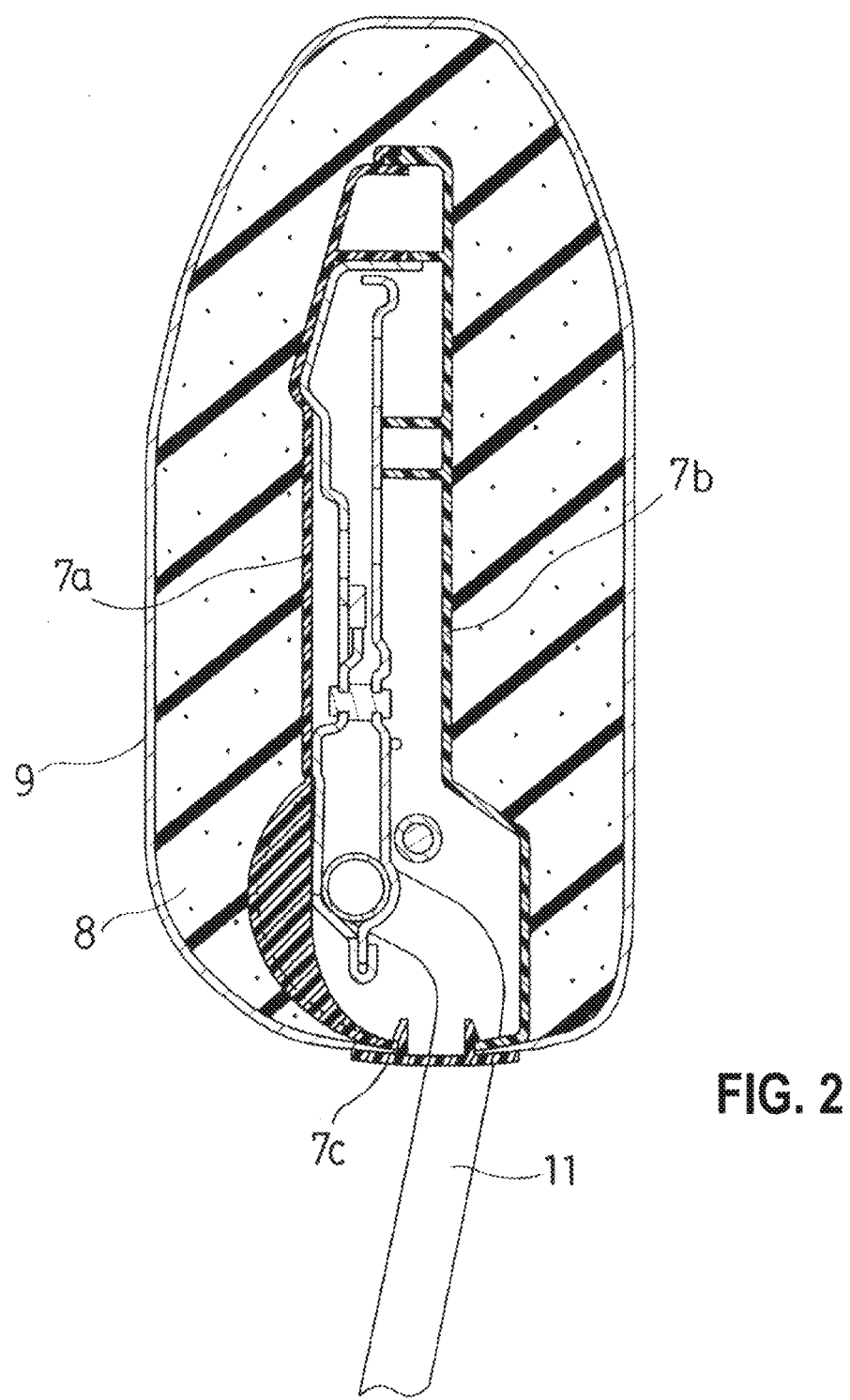
FIG. 2 is a sectional view taken along the line A-A of FIG. 1.

As shown in FIG. 2, a pad material 8 is disposed at the outer periphery of the cover material 7, and a seat cover material 9 covers the pad material 8.

Figure 13:
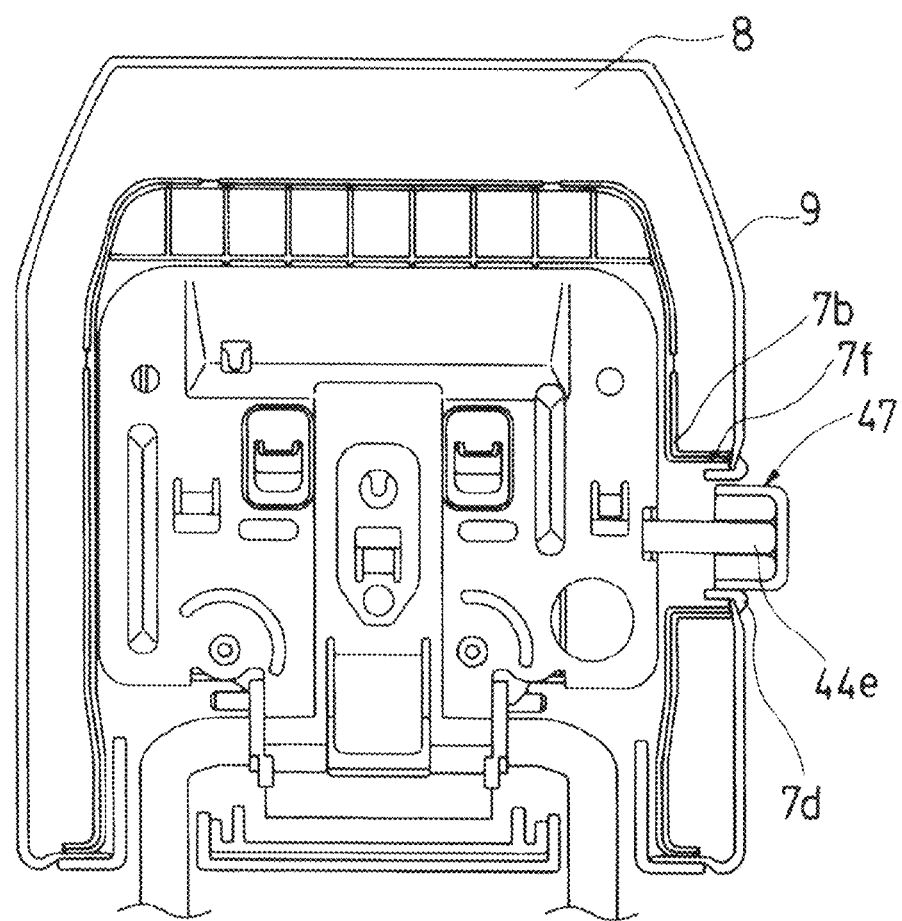
FIG. 13 is a schematic sectional view showing a transverse cross section of a headrest.
Figure 14:
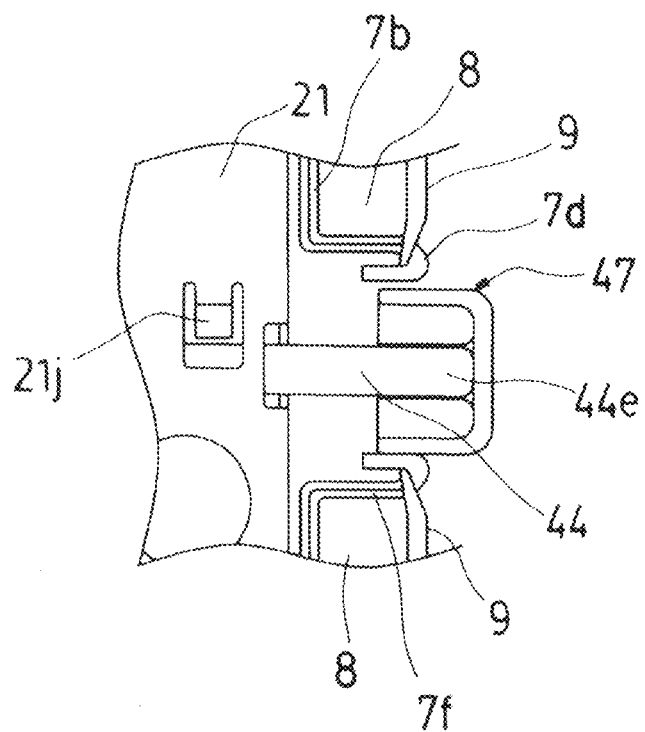
FIG. 14 is a partially expanded view of FIG. 13.

FIG. 13 is a schematic sectional view showing the transverse cross section of the headrest, and FIG. 14 is a partially expanded view of FIG. 13. Referring to these figures, a state in which the operation knob 47 side comes closest to or into contact with the garnish 7d is explained.

As shown in FIG. 13, the headrest frame is covered with the cover material 7 comprising the resin-made front cover member 7a and rear cover member 7b. At this time, the cover material 7 is formed with a hollow cylindrical flange part 7f so that the cylindrical flange part 7f surrounds the end part of the ratchet lever 44. In this cylindrical flange part 7f, the garnish 7d is disposed. The terminal treatment is accomplished by holding the end part of the seat cover material 9 between the cylindrical flange part 7f and the garnish 7d. The end part 44e of the ratchet lever 44 extends from a space formed by the cylindrical flange part 7f and the garnish 7d, and the operation knob 47 is attached to the end part 44e. Since the movement locking part 44c of the ratchet lever 44 is urged slantwise downward by the above-described spring 45, the operation knob 47 comes closet to or into contact with the garnish 7d, so that regulation is accomplished.

As shown in FIGS. 3, 7 and 11, the ratchet 46 of this embodiment includes a rotation hole 46a serving as a rotation axis, an engagement part 46b, and the lock engagement point 46c, and is pivotally supported on the headrest frame 2 with the rivet 101 arranged between the main frame 21 and the sub frame 22 being used as a rotation shaft.

On the inside (the opposed side) of the main frame 21 and the sub frame 22, the substantially arc-shaped protruding parts 21f and the substantially arc-shaped protruding parts 22f are formed so as to project toward the rotating surface of the ratchet 46 to guide the rotating of the ratchets 46.

The engagement part 46b on one end side of the ratchet 46 engages with the engagement concave part 44b, 44b of the ratchet lever 44, and the lock engagement point 46c on the other end side engages with the engagement groove part 41a, 42a of the latch plate 41, 42, whereby the raised state of the headrest HR is kept.

The engagement part 46b on one end side of the ratchet 46 engages with the engagement concave part 44b, 44b of the ratchet lever 44, and the surface tangent to the engagement concave part 44b, 44b is formed into a circular shape, preferably into a complete round shape. Thereby, the ratchet 46 can be rotated stably following the movement of the ratchet lever 44. The ratchet 46 has a thickness larger than that of the ratchet lever 44. Therefore, the ratchet 46 can be prevented from coming off the ratchet lever 44.

Also, as shown in FIG. 11, the distance X1 between the center of the rotation hole 46a of the ratchet 46 and the center of the engagement part 46b on one end side of the ratchet 46 engaging with the engagement concave part 44b of the ratchet lever 44 is set so as to be longer than the distance Y1 between the center of the rotation hole 46a of the ratchet 46 and the position of the lock engagement point 46c (in FIG. 11, the locus 46d) on the other end side of the ratchet 46 crossingly engaging with the engagement groove part 42a of the latch plate 42. Thereby, the release load at the time when the engagement (locking) of the ratchet 46 with the latch plate 41, 42 is released can be reduced.

That is to say, in this embodiment, in the raised state, the ratchet 46 pivotally supported on the headrest frame 2 is urged toward the tilt direction by the spring 33, so that friction occurs in a portion in which the ratchet 46 is in contact with the engagement groove part 42a of the latch plate 42. Therefore, when the ratchet 46 is rotated from the engagement position at which the ratchet 46 is positioned in the engagement groove part 42a of the latch plate 42 to the disengagement position at which the ratchet 46 deviates from the engagement groove part 42a, frictional resistance arises, so that a state in which the ratchet 46 is difficult to rotate is formed.

However, the ratchet 46 of this embodiment is formed so that the distance X1 between the center (support point) of the rotation hole 46a and the center (power point) of the engagement part 46b to which a load is applied by the ratchet lever 44 is longer than the distance Y1 between the center (support point) of the rotation hole 46a and the position (point of application) of the lock engagement point 46c crossingly engaging with the engagement groove part 42a of the latch plate 42. Therefore, the ratchet 46 can be moved from the engagement position to the disengagement position with a small force. That is to say, a so-called link ratio can be set, and thereby the release load can be adjusted.

Also, since the ratchet lever 44 is configured so as to hold one circular end side of the ratchet 46 and to allow the ratchet 46 to rotate, the engagement part 46b on one end side of the ratchet 46 is held in the engagement concave part 44b of the ratchet lever 44, and always engages with the ratchet lever 44, so that the turning of only one ratchet 46 can be prevented. That is to say, the ratchets 46 smoothly turn always following the movement of the ratchet lever 44, malfunction is prevented, and a changeover due to the locking elements 4 can be accomplished with certainty.

The ratchet 46 of this embodiment can rotate in a rotation angle range of 20 to 40 degrees around the rotation hole (rotation axis) 46a.

If the ratchet 46 is configured so as to rotate in a rotation angle range of 20 to 40 degrees around the rotation hole (rotation axis) 46a, disengagement of the ratchet 46 from the latch plate 41, 42 due to the rotation from the engagement position to the disengagement position and the transverse displacement of the ratchet lever 44 for the rotation of the ratchet 46 can be adjusted so as to be optimum. Thus, the displacement relating to the operation can be adjusted by the locking elements 4.

The seat cover material 9 of this embodiment is formed into a bag shape one end side of which is open. The front cover member 7a and the rear cover member 7b in which the headrest frame 2 and other various members are fitted are inserted through the opening part, and the seat cover terminal part on the opening side of the seat cover material 9 is covered by the seat cover fastening cover member 7c. An assembly of the seat cover material 9 and the cover material 7 is arranged in the cavity of a mold, and foaming is performed by injecting a foaming resin into a space between the seat cover material 9 and the cover material 7, whereby the pad material 8 is molded integrally with the seat cover material 9 and the cover material 7.

Next, the operation of the headrest HR configured as described above is explained.

Since the headrest frame 2 of the headrest HR is rotatably mounted to the transverse shaft part 12 of the pillar 1, and is fixed by the locking elements 4, the headrest HR at the normal time can protect the head of a seated person when a shock is applied in a raised state.

That is to say, the pillar 1 mounted on the upper part of the seat back S2 has the transverse shaft part 12, and the transverse shaft part 12 of the pillar 1 and the headrest frame 2 are rotatably engaged with each other. At the normal time, the headrest frame 2 is urged so as to be tilted by the headrest frame urging elements 3. In the case of the raised state, the tilt is made in a locked state by the locking elements 4 provided between the headrest frame 2 and the pillar 1. This raised state is shown in FIGS. 4 to 7. Therefore, the headrest HR is in the raised state as shown in FIG. 2.

In the locking elements 4, when the engagement part 46b on one end side of the ratchet 46 is pushed by the sliding motion of the ratchet lever 44, the ratchet 46 rotates around the rotation axis, and the lock engagement point 46c on the other end side of the ratchet 46 moves in the direction crossing the engagement groove part 41a, 42a of the latch plate 41, 42.

In the case of the raised state, the ratchet 46 is located in the engagement groove part 41a, 42a and is in contact with the latch plate 41, 42. Therefore, the pillar 1 and the headrest frame 2 are in a locked state, and the raised state of the headrest HR is kept.

By operating the ratchet lever 44 against the ratchet lever urging element 45, the engagement part 46b on one end side of the ratchet 46 is pushed, and the ratchet 46 is rotated around the rotation axis. Therefore, the ratchet 46 retracts from the engagement groove part 41a, 42a, and the ratchet 46 comes off the engagement groove part 41a, 42a of the latch plate 41, 42. At this time, at the normal time, the spring 33, which is the headrest frame urging element 3, urges the headrest frame 2 toward the tilt direction, so that the headrest HR tilts around the transverse shaft part 12, becoming in a storage state.

As described above, when the headrest HR is made in the head support state in which the headrest HR is raised with respect to the seat back S2 and in the storage state tilted from the head support state, in the present invention, the ratchet lever 44, the latch plates 41 and 42, and the ratchets 46 are used as the locking elements 4, and the changeover between the engagement position and the disengagement position is accomplished via the ratchet 46 one end side of which engages with the engagement concave part 44b of the ratchet lever 44 and the other end side of which can crossingly engage with the engagement groove part 41a, 42a of the latch plate 41, 42. Therefore, the locking elements 4 themselves can be configured so as to be compact without requiring a great width. Moreover, since at least one of the engagement groove parts 41a and 42a of the latch plates 41 and 42 serving as the locking members is formed so that the upper end side thereof is narrower, the contact point between the latch plate 42 and the ratchet 46 separates from the transverse shaft part 12 of the pillar 1. Therefore, the release load due to the urging force of the headrest frame urging element 3 (the spring 33) from the rear at the time when the locking is released can be reduced.

Also, at the normal time, by the ratchet lever urging element 45, the ratchet lever 44 is urged in the direction in which the ratchet 46 is engaged with the engagement groove part 41a, 42a of the latch plate 41, 42. By the operation of the ratchet lever 44 against the ratchet lever urging element 45, the ratchet 46 is disconnected from the engagement groove part 41a, 42a, and by the headrest frame urging element or elements 3, the headrest frame 2 is tilted to the storage state, so that the headrest HR tilts. Therefore, the locking of the locking elements 4 can be released by one operation (one action).

Furthermore, by making one end side of the ratchet 46, which is in contact with the engagement concave part 44b of the ratchet lever 44, circular, the ratchet 46 is turned smoothly in the engagement concave part 44b of the ratchet lever 44 with the movement of the ratchet lever 44. Therefore, the ratchet 46 can be engaged with and disengaged from the engagement groove part 41a, 42a of the latch plate 41, 42, so that an exact locking releasing operation can be performed.

In the case where the headrest HR in the storage state is made in the raised state, since at the normal time, the ratchet lever 44 is urged by the ratchet lever urging element (spring) 45, and the ratchet 46 is urged in the direction in which the ratchet 46 engages with the engagement groove part 41a, 42a of the latch plate 41, 42, when the headrest HR is raised by hand, the ratchet 46 rotates and the lock engagement point 46c engages with the engagement groove part 41a, 42a of the latch plate 41, 42, whereby a locked state is established.

In the above-described embodiment, two latch plates 41 and 42 serving as the locking members of the locking elements 4, and two ratchets 46 serving as the fixing member are provided. However, the number of these elements may be one or three or more. It is a matter of course that according to the number, one or a plurality of engagement concave parts 44b of the ratchet lever 44 serving as the operation lever can be formed.

DESCRIPTION OF SYMBOLS 1 pillar
2 headrest frame
3 headrest frame urging element or elements
4 locking element or elements
7 cover material
7a front cover member
7b rear cover member
7c seat cover fastening cover member
7d garnish
7f cylindrical flange part
8 pad material
9 seat cover material
11 leg part 12 transverse shaft part
21 main frame
21a lower assembling concave part
21b hemming staking part
21c bent wall part
21d cut-away part
21e boss part
21f protruding part
21g jutting-out part
21h, 21i, tongue piece
21j
21k looseness preventing piece
21m cut-away part
21p embossed part
21r hemming staking part
21s slit
21u locking part
22 sub frame
22a lower assembling concave part
22b hemming staking part
22c bent part
22d expanding part
22e boss part
22f protruding part
22g blanked drawn part
22h hole
22k urge receiving part
22p embossed part
31 shaft
32 damper
33 spring
33a one end
33b the other end
41, 42 latch plate
41a, 42a engagement groove part
41b, 42b outer peripheral part
41c, 42c stopper part
41d, 42d shaft insertion hole
41e, 42e stopper part
42f upper end part
42g groove bottom
44 ratchet lever
44a main plate body
44b, 44b engagement concave part
44c movement locking part
44d locking part
44e end part
44f, 44f jutting-out part
45 ratchet lever urging element or elements (spring)
46 ratchet
46a rotation hole
46b engagement part
46c lock engagement point
46d locus
47 operation knob
101, 102 rivet
101a, central part
102a
101b, staking part
102b
S vehicle seat
S1 seat cushion
S2 seat back
HR headrest

The invention claimed is:

1. A headrest assembly capable of being made in a head support state in which a headrest is raised with respect to a seat back, and in a storage state in which the headrest is tilted from the head support state, comprising:
   a pillar having a transverse shaft part;
   a headrest frame rotatable relative to an upper portion of the seat back;
   a headrest urging element or elements that urge the headrest frame in a tilt direction;
   a locking element or elements that hinder rotating of the headrest frame relative to the pillar;
   a ratchet lever that comprises a concave part and that operates the locking element or elements and slides in a transverse direction; and
   a ratchet lever urging element or elements that urge the ratchet lever,
   wherein:
      the locking element or elements comprises:
         a latch plate disposed on the pillar and formed with an elongated engagement groove at a ratchet lever side; and
         a ratchet that is movably connected to the ratchet lever and is rotatably supported by the headrest frame, wherein the ratchet comprises an end portion that is movably received in the concave part of the ratchet lever;
      one end in a longitudinal direction of the engagement groove of the latch plate is open ended;
      a movement of the ratchet lever allows the ratchet to rotate to engage with and to disengage from the engagement groove from a side of the open end;
      the ratchet lever urging element or elements is attached to the ratchet lever that is slidable in the transverse direction and urges the ratchet lever in a direction at a substantially non-zero predetermined angle to the ratchet lever;
      the headrest frame comprises a looseness preventing piece that contacts the pillar;
      the ratchet lever comprises a pair of jutting-out parts projecting to the pillar; and
      each of the pair of jutting-out parts is disposed each side of the looseness preventing piece in a lateral direction.

2. The headrest assembly according to claim 1, wherein the latch plate and the ratchet have a plate shape respectively and are perpendicularly engaged with each other.

3. The headrest assembly according to claim 1, wherein the ratchet lever is a one-piece ratchet lever.

4. The headrest assembly according to claim 1, wherein the headrest is rotatable about a first rotational axis and the ratchet is rotatable about a second rotational axis that is transverse to the first rotational axis.

5. A headrest assembly capable of being made in a head support state in which a headrest is raised with respect to a seat back, and in a storage state in which the headrest is tilted from the head support state, comprising:
   a pillar having a transverse shaft part;
   a headrest frame rotatable relative to an upper portion of the seat back;
   a headrest urging element or elements that urge the headrest frame in a tilt direction;
   a locking element or elements that hinder rotating of the headrest frame relative to the pillar;
   a ratchet lever that comprises a concave part and that operates the locking element or elements and slides in a transverse direction; and
   a ratchet lever urging element or elements that urge the ratchet lever,
   wherein:
      the locking element or elements comprises:

a latch plate disposed on the pillar and formed with an elongated engagement groove at a ratchet lever side; and a ratchet that is movably connected to the ratchet lever and is rotatably supported by the headrest frame, wherein the ratchet comprises an end portion that is movably received in the concave part of the ratchet lever;

one end in a longitudinal direction of the engagement groove of the latch plate is open ended;

a movement of the ratchet lever allows the ratchet to rotate to engage with and to disengage from the engagement groove from a side of the open end; and the ratchet lever urging element or elements is attached to the ratchet lever that is slidable in the transverse direction and urges the ratchet lever in a direction at a substantially non-zero predetermined angle to the ratchet lever;

an axis of the ratchet extends in a seat front-to-rear direction; and the ratchet is disposed in a plane containing the entire movement path of the ratchet lever, said plane being perpendicular to the axis of the ratchet.

6. The headrest assembly according to claim 5, wherein the latch plate and the ratchet have a plate shape respectively and are perpendicularly engaged with each other.

7. The headrest assembly according to claim 5, wherein:
the headrest frame comprises a looseness preventing piece that contacts the pillar;
the ratchet lever comprises a pair of jutting-out parts projecting to the pillar; and
each of the pair of jutting-out parts is disposed each side of the looseness preventing piece in a lateral direction.

8. The headrest assembly according to claim 5, wherein the ratchet lever is a one-piece ratchet lever.

9. The headrest assembly according to claim 5, wherein the headrest is rotatable about a first rotational axis and the ratchet is rotatable about a second rotational axis that is transverse to the first rotational axis.

10. A headrest assembly capable of being made in a head support state in which a headrest is raised with respect to a seat back, and in a storage state in which the headrest is tilted from the head support state, comprising:
a pillar having a transverse shaft part;
a headrest frame rotatable relative to an upper portion of the seat back;
a headrest urging element or elements that urge the headrest frame in a tilt direction;
a locking element or elements that hinder rotating of the headrest frame relative to the pillar;
a one-piece ratchet lever that comprises a concave part and that operates the locking element or elements and slides in a transverse direction; and
a ratchet lever urging element or elements that urge the ratchet lever,
wherein:
the locking element or elements comprises:
a latch plate disposed on the pillar and formed with an elongated engagement groove at a ratchet lever side; and
a ratchet that is movably connected to the ratchet lever and is rotatably supported by the headrest frame, wherein the ratchet comprises an end portion that is movably received in the concave part of the ratchet lever;
one end in a longitudinal direction of the engagement groove of the latch plate is open ended;
a movement of the ratchet lever allows the ratchet to rotate to engage with and to disengage from the engagement groove from a side of the open end; and
the ratchet lever urging element or elements is attached to the ratchet lever that is slidable in the transverse direction and urges the ratchet lever in a direction at a substantially non-zero predetermined angle to the ratchet lever.

11. The headrest assembly according to claim 10, wherein the latch plate and the ratchet have a plate shape respectively and are perpendicularly engaged with each other.

12. The headrest assembly according to claim 10, wherein the headrest is rotatable about a first rotational axis and the ratchet is rotatable about a second rotational axis that is transverse to the first rotational axis.

13. A headrest assembly capable of being made in a head support state in which a headrest is raised with respect to a seat back, and in a storage state in which the headrest is tilted from the head support state, comprising:
a pillar having a transverse shaft part;
a headrest frame rotatable relative to an upper portion of the seat back;
a headrest urging element or elements that urge the headrest frame in a tilt direction;
a locking element or elements that hinder rotating of the headrest frame relative to the pillar;
a ratchet lever that comprises a concave part and that operates the locking element or elements and slides in a transverse direction; and
a ratchet lever urging element or elements that urge the ratchet lever,
wherein:
the locking element or elements comprises:
a latch plate disposed on the pillar and formed with an elongated engagement groove at a ratchet lever side; and
a ratchet that is movably connected to the ratchet lever and is rotatably supported by the headrest frame, wherein the ratchet comprises an end portion that is movably received in the concave part of the ratchet lever;
one end in a longitudinal direction of the engagement groove of the latch plate is open ended;
a movement of the ratchet lever allows the ratchet to rotate to engage with and to disengage from the engagement groove from a side of the open end;
the ratchet lever urging element or elements is attached to the ratchet lever that is slidable in the transverse direction and urges the ratchet lever in a direction at a substantially non-zero predetermined angle to the ratchet lever; and
the headrest is rotatable about a first rotational axis and the ratchet is rotatable about a second rotational axis that is transverse to the first rotational axis.

14. The headrest assembly according to claim 13, wherein a vertical movement component of a portion of the ratchet creates engagement with the latch plate by a direct interference contact.

15. The headrest assembly according to claim 13, wherein the ratchet lever urging element or elements urges the ratchet lever in a direction toward the latch plate at a predetermined angle to a direction of the movement of the ratchet lever.

16. A vehicle seat comprising the headrest assembly according to claim 13, wherein the operation lever urging element or elements urges the operation lever in a direction toward the latch plate at a predetermined angle to a direction of the movement of the operation lever.

17. The headrest assembly according to claim 13, wherein an end of the ratchet lever urging element or elements is directly connected to the ratchet lever and an other end of the ratchet lever urging element or elements is directly connected to the headrest frame.

18. A vehicle seat comprising the headrest assembly according to claim 13, wherein an end of the operation lever urging element or elements is directly connected to the operation lever and an other end of the operation lever urging element or elements is directly connected to the headrest frame.

19. The headrest assembly according to claim 13, wherein the engagement groove is longer in a vertical direction than in a lateral direction.

20. The headrest assembly according to claim 13, wherein the ratchet lever urging element or elements urges the ratchet lever downward.

21. The headrest assembly according to claim 13, wherein the ratchet lever urging element or elements is disposed outside relative to the ratchet.

22. The headrest assembly according to claim 13, wherein:
the headrest frame comprises a looseness preventing piece that contacts the pillar;
the ratchet lever comprises a pair of jutting-out parts projecting to the pillar; and
each of the pair of jutting-out parts is disposed each side of the looseness preventing piece in a lateral direction.

23. The headrest assembly according to claim 13, wherein:
the headrest frame comprises a main frame and a sub frame; and
the ratchet lever is held between the main frame and the sub frame.

24. The headrest assembly according to claim 23, wherein:
each of the main frame and the sub frame is formed with an embossed part projecting to a ratchet lever; and
the ratchet lever is held between the embossed part of the main frame and the embossed part of the sub frame.

25. The headrest assembly according to claim 24, wherein each of the embossed part of the main frame and the embossed part of the sub frame overlaps with the ratchet in a vertical direction.

26. The headrest assembly according to claim 13, wherein the latch plate and the ratchet have a plate shape respectively and are perpendicularly engaged with each other.

27. The headrest assembly according to claim 13, wherein:
the ratchet lever comprises a projecting portion that projects in a direction perpendicular to a direction of the movement of the ratchet lever; and
the ratchet lever urging element or elements is attached to the projecting portion at a predetermined angle to the projecting direction.

* * * * *